US00RE34374E

United States Patent [19]

Davidson

[11] E Patent Number: Re. 34,374

[45] Reissued Date of Patent: Sep. 14, 1993

[54] ADJUSTABLE TEMPLATE DEVICE FOR FRAMING AND CUTTING SHEET MATERIALS

[76] Inventor: James A. Davidson, 4300 Laurel Hills Rd., Raleigh, N.C. 27612

[21] Appl. No.: 697,099

[22] Filed: May 8, 1991

Related U.S. Patent Documents

Reissue of:

[64] Patent No.: 4,831,739
Issued: May 23, 1989
Appl. No.: 255,870
Filed: Oct. 11, 1988

U.S. Applications:

[63] Continuation-in-part of Ser. No. 158,897, Feb. 22, 1988, abandoned.

[51] Int. Cl.[5] ..... B43L 7/00

[52] U.S. Cl. ..... 33/427; 33/DIG. 9; 33/566; 144/144.5 R; 144/144.5 GT; 409/130

[58] Field of Search ..... 409/130; 144/144.5 R, 144/144.5 GT; 33/DIG. 9, 18.1, 427, 566

[56] References Cited

U.S. PATENT DOCUMENTS

| | | | |
|---|---|---|---|
| 2,720,706 | 10/1955 | Laine | 33/95 |
| 2,782,513 | 2/1957 | Brandt | 33/95 |
| 3,224,100 | 12/1965 | Rose | 33/95 |
| 3,486,232 | 12/1969 | Klauberg | 33/1 |
| 3,875,670 | 4/1975 | Hudgins | 33/174 |
| 3,985,168 | 10/1976 | Lundquist | 144/144.5 |
| 4,638,569 | 1/1987 | Dove | 33/562 |
| 4,697,351 | 10/1987 | Hopfer | 33/420 |

*Primary Examiner*—W. Donald Bray
*Attorney, Agent, or Firm*—Senniger, Powers, Leavitt & Roedel

[57] ABSTRACT

An adjustable template device for positioning over a sheet material for use in framing and cutting the sheet material to a selected shape comprising a plurality of slidably interconnected frame members forming a closed polygon. Each frame member comprises a guide edge for guiding a cutting blade and a socket adjacent one end of the guide edge for slidably receiving a portion of an adjacent frame member so that the guide edges of adjacent frame members form the sides and one corner of the polygon formed by the device. Each of the guide means has a plurality of detents which are engageable by a pin associated with each socket to retard relative sliding of adjacent frame members. The guide edges are preferably provided with a plurality of slots for receiving a cutting blade so that a cutting blade can extend in the slots to fully cut the corners formed by the frame members. At least some of these slots are positioned relative to the detents to ensure alignment with the adjacent cutting edge. In a second embodiment, each frame member has a curved support surface against which the adjacent frame member is held with an adjustable gripper member.

16 Claims, 2 Drawing Sheets

FIG. 1.
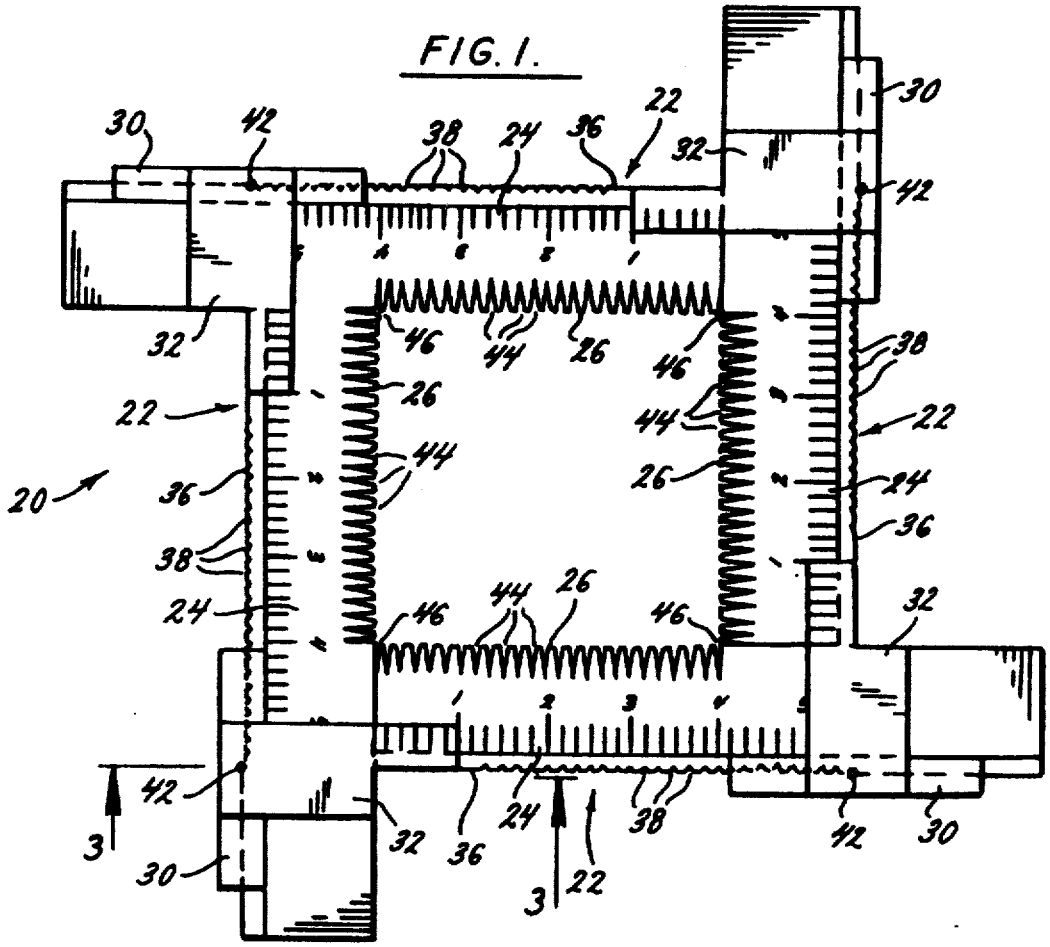
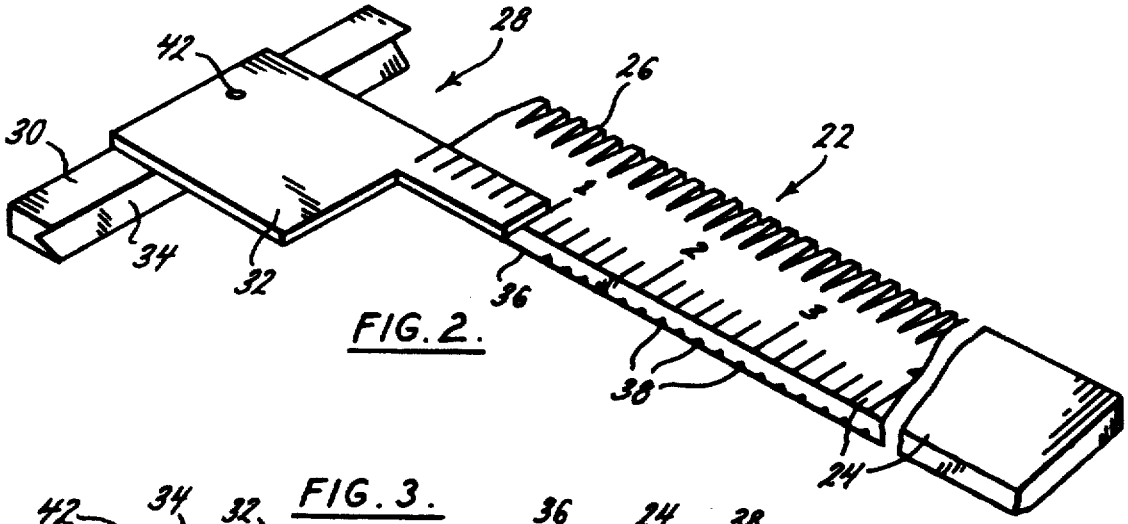
FIG. 2.
FIG. 3.
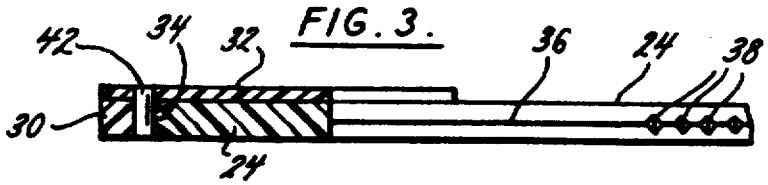

ADJUSTABLE TEMPLATE DEVICE FOR FRAMING AND CUTTING SHEET MATERIALS

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation-in-part of the inventor's previous application Ser. No. 07/158,897, filed Feb. 22, 1988, now abandoned.

BACKGROUND OF THE INVENTION

This invention relates to templates, and in particular to a template for use in framing and cutting sheet materials.

In graphic arts and other fields it is often desirable to cut photographs, paper, films or other thin sheet materials to a particular size and shape, for example to fit in a layout. This is tedious work, requiring numerous careful measuring and cutting steps to ensure that the cut-out is the correct size and shape. For example to crop a photograph to fit a particular opening in a layout, the opening must be carefully measured, these measurements must be transferred to the photograph, and the photograph carefully cut to form a cutout of the required shape and size.

This cutting is sometimes done with a conventional paper cutter, however it is difficult to accurately align the lines to be cut because the cutting blade is so high above the cut lines. This problem is compounded by the fact that several cuts generally must be made to form the cut-out. This method cannot be used where it is necessary to make a cut-out from the interior of a sheet without cutting the surrounding portions of the sheet. The cutting may also be done with a straight edge and a knife blade. Alignment of the cut line is easier because the straight edge may be placed directly on the sheet material. However, the work is still tedious because the straight edge usually has to be repositioned several times to make the cut-out.

In addition to being tedious and time consuming, it is difficult to produce a cut-out with sharp, squared-off corners with either of the above methods. It is also difficult to visualize precisely what the cut-out will look like until all the cuts are made. This is particularly true if the cut out is an unusual shape, for example triangular, pentagonal, or other non-rectangular shape.

A number of polygonal templates have been made in the past for various uses, for example U.S. Pat. Nos. 3,985,168 and 3,875,670 disclose templates for routers; U.S. Pat. Nos. 3,486,232 and 2,782,513 disclose templates for drawing. None of these are satisfactory for use in measuring, framing, and guiding a cutting blade to make a cut out from a sheet material. In particular, their locking mechanisms are two cumbersome and hard to manipulate, and would interfere with cutting. Furthermore, these devices would not achieve cut-outs with sharp corners. Finally these devices generally are not adapted to form polygonal shapes other than rectangles.

SUMMARY OF THE INVENTION

Among the objects of the present invention is the provision of a template device for use in measuring and framing a portion of a sheet material and guiding a cutting blade to form a cut-out from the sheet material. It is also among the objects of at lest some embodiments of this invention to provide such a device that can be releasably locked in a particular configuration. It is also among the objects of at least some embodiments to provide such a device which permits the cutting blade to extend all the way in to the corners to form cut-outs with sharp corners. It further among the objects of at least some embodiments of this invention to provide such a device that can be used to measure, frame, and cut polygonal shapes other than rectangles, and in particular to provide such a device which can be releasable locked in a wide range of polygonal configurations.

The device of the present invention is adapted for placement over a sheet material for use in framing and cutting the sheet material to a selected shape. Generally, this device comprises a plurality of slidably interconected frame members forming a closed polygon. Each of these frame members comprises a guide edge, which is adapted for guiding a cutting blade, and means, such as a socket, adjacent one end of the guide edge for slidably receiving a portion of an adjacent frame member such that the guide edges of the adjacent frame members form the sides and one corner of the polygon formed by the device.

Each of the frame members may have a slot in the guide edge, adjacent the socket and aligned with the guide edge of the adjacent frame member that is received in the socket, so that a cutting blade guided along the guide edge of said adjacent frame member can extend into the slot to fully cut the corner of the polygon.

The device may further include ratchet means for retarding relative sliding of adjacent frame members. For example each of the frame members may be provided with a plurality of detents, and each frame member may have means for engaging the detents on the adjacent frame member. The guide edges may be provided with a plurality of slots, positioned relative to the detents such that when a detent on a first frame member is engaged by the engaging means on a second frame member, a slot on the first frame member is aligned with the guide edge of the second frame member so that a cutting blade guided along the guide edge of the second frame member can extend into the slot to fully cut the corner formed by the frame members.

In a second embodiment of the invention particularly adapted for forming polygons of varying numbers of sides and configurations, the device generally comprises a plurality of interconnected frame members forming a closed polygon. Each frame member comprising a guide edge for guiding a cutting blade and means adjacent one end of the guide edge for engaging an adjacent frame member such that the guide edges of the adjacent frame members form the sides and a corner of the polygon formed by the device. This engaging means preferably comprises a curved support surface, a gripper member, and means for adjustably mounting the gripper member opposite the curved support surface to hold a portion of the adjacent frame member tangentially against the curved support surface. This curved support surface allows adjacent frame members to be connected in a wide range of positions and angular configurations.

The adjustable template device of this invention can be used to measure a desired shape and size for a cut-out and then be placed over the sheet material from which the cut-out is to be made so that the user can visualize what the cut-out will look like. The locking means allows the device to retain its shape as it moved, so that the cut-out is accurately formed. The device can then be used as a guide for a cutting blade. The slots in the guide edges allow the cutting blade to extend completely into the corners of the template to form sharp corners on the cut-out.

The second embodiment of the template device can be used in a similar manner to measure a shape and size for a non-rectangular polygonal cut-out. The curved support surface and the gripper permit the device to form a wide variety of polygonal shapes and sizes. The device can be secured in the desired configuration so that the user can visualize what the cut-out will look like, and use the device to form the cut out.

These and other advantages will be in part apparent and in part pointed out hereinafter.

BRIEF DESCRIPTION OF THE DRAWINGS

FIG. 1 is a top plan view of a first embodiment of a template device constructed according to the principles of this invention.

FIG. 2 is a perspective view of one of the frame members forming the template device of FIG. 1;

FIG. 3 is a partial cross-sectional view of the device taken along the plane of line 3—3 in FIG. 1, showing the connection between adjacent frame members;

Corresponding references numerals indicate corresponding parts throughout the several views of the drawings.

DETAILED DESCRIPTION OF THE PREFERRED EMBODIMENT

Figure 4:
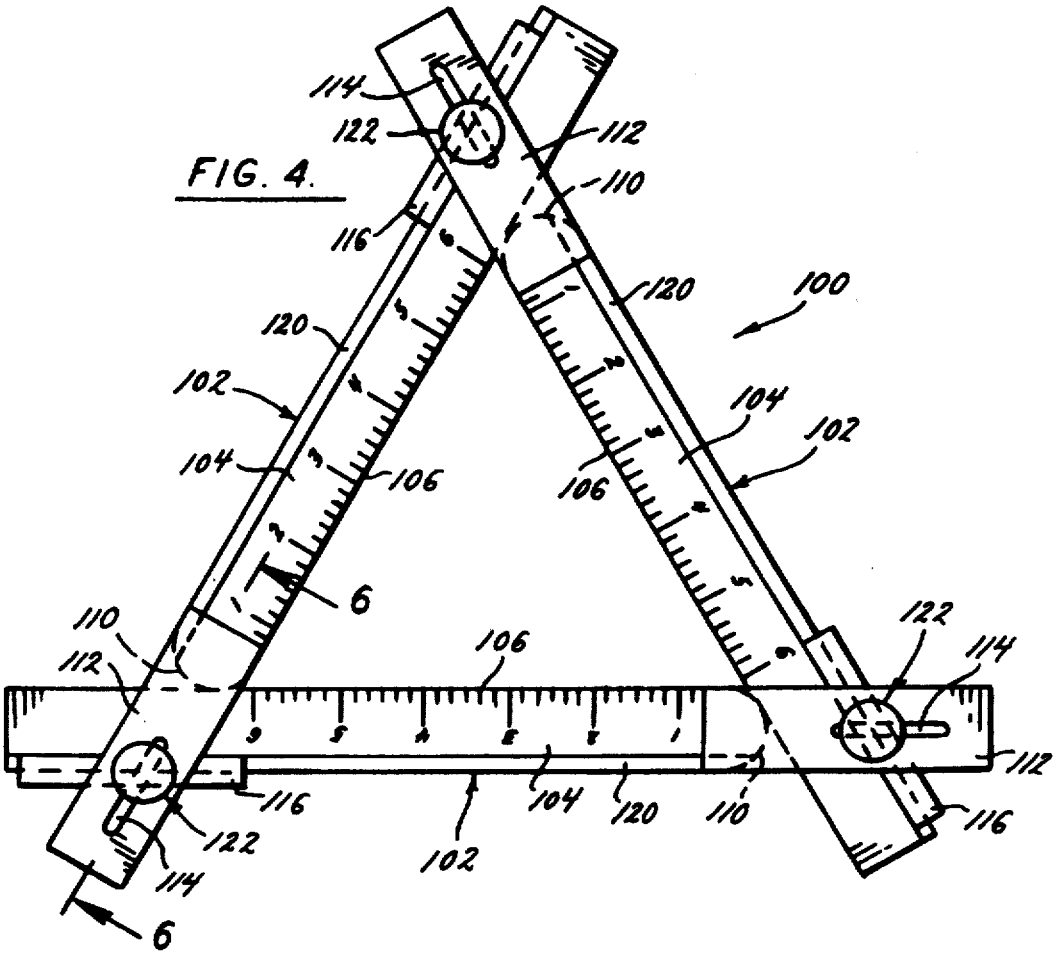
FIG. 4 is a top plan view of a second embodiment of a template device constructed according to the principles of this invention.
Figure 5:
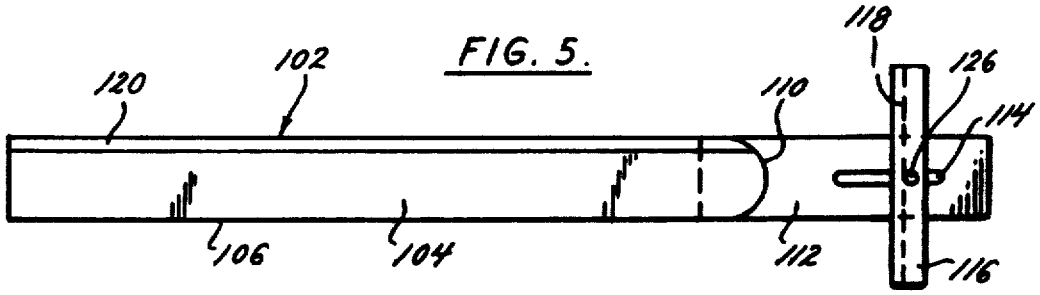
FIG. 5 is a bottom plan view of one of the frame members forming the template device of FIG. 4.
Figure 6:
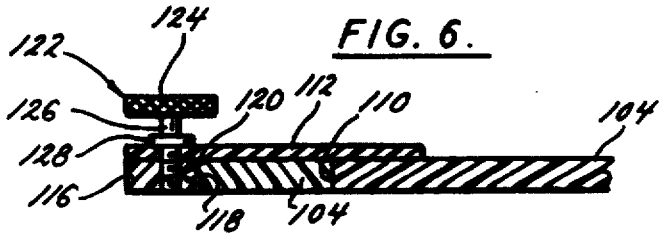
FIG. 6 is a partial cross-sectional view of the device taken along the plane of line 6—6 in FIG. 4, showing the connection between adjacent frame members.

A first embodiment of an adjustable template device constructed according to the principles of this invention is indicated generally as 20 in FIG. 1. The device 20 is adapted for placement over a sheet material for use in framing and cutting the sheet material to a selected shape. The device 20 comprises plurality of slidably interconnected frame members 22 forming a closed polygon. In the preferred embodiment there are four frame members 22, forming a rectangle. Each frame member 22 comprises a body 24 having a guide edge 26 which is adapted for guiding a cutting blade to cut one of the sides of the cut-out. Each frame member 22 further comprises a means, such as socket 28, adjacent one end of the guide edge 26 for slidably receiving the body of an adjacent frame member 22 such that the guide edges 26 of adjacent frame members form two sides and a corner of the polygon formed by the device. In the preferred embodiment socket 28 receives the body 24 of an adjacent frame member so that the guide edges of adjacent frame members are perpendicular.

In this preferred embodiment the socket 28 is formed by a guide member 30, spaced from the end of the body 24 with a bridge 32. As best shown in FIGS. 2 and 3, the inner side of the guide has a generally V-shaped groove 34 adapted to receive the beveled edge 36 of the adjacent frame members. The beveled edges 36 on the frame members and the grooves 34 cooperate to retain the frame members in the sockets while allowing the frame members to slide therein. The body 24 of each frame member 22 may be provided with measuring indicia starting at the end of the body adjacent to the socket 28 to indicate the length of the side formed by the guide edge 26 of the particular frame member.

The device 20 preferably further comprises ratchet means for retarding relative sliding of adjacent frame members. Each frame member preferably has a plurality of longitudinally spaced detents 38 on the beveled edge 36, generally opposite the guide edge 26. These detents 38 are preferably evenly spaced to provide a plurality of evenly spaced stopped positions for the frame members. The detents are preferably spaced at some convenient distance for the particular application of the device, for example, for use in lay out designs, the detents 38 may be spaced one pica apart, although there may be some other spacing in devices used for other purposes. The ratchet means preferably comprises means associated with each socket 28 for engaging these detents. This means may be a flexible, resilient pin 42 in the guide member 30, extending at least partially into the V-shaped groove 34. The pin is flexible to releasably engage the detents 38, so that the frame members can slide in the sockets. The bridge 32 may also flex somewhat to allow the pin 42 to clear the detents and permit the frame members to slide in the socket.

The guide edge 26 of each frame member preferably has a plurality of V-shaped slots 44 extending along its length. The slots 44 are preferably sized and spaced so that they do not interfere with the guide edge's function of guiding a cutting blade. The slots 44 are preferably positioned relative to the detents 38 so that when a particular detent 38 on a first frame member is engaged by the engaging pin 42 of a second frame member, a slot 44 on the first frame member is aligned with the guide edge 26 of the second frame member. Thus, a cutting blade guided along the guide edge 26 of the second frame member can extend into the slot 44 to fully cut the corner formed between the frame members. Thus the corners cut with the aid of the device 20 are fully cut and are sharply formed.

In addition to, or in place of slots 44, the guide edge 26 of each frame member 22 may have a slot 46 therein adjacent the socket 28 and aligned with the guide edge of the adjacent frame member that is received in the socket. Thus a cutting blade guided along the guide edge of this adjacent frame member can extend into the slot 46 to fully cut the corner formed between the frame members. Generally a slot 44 will be positioned at one side of a guide edge and a slot 46 at the other side of the guide edge. The sides can be cut in either direction, starting in a slot 44 and extending to a slot 46, or vice versa.

A second embodiment of an adjustable template device is indicated generally as 100 in FIG. 4. The device 100 is particularly adapted for forming non-rectangular polygons. The device 100, like device 20, is adapted for placement over a sheet material for use in framing and cutting the sheet material to a selected shape. The device 100 comprises plurality of adjustably interconnected frame members 102 forming a closed polygon. As shown in FIG. 4, the device 100 comprises three frame members 102 forming a triangle, however the device could include more frame members 102 if it were desired to form a polygonal cut-out with more than three sides. Each frame member 102 comprises an elongate body 104 having a guide edge 106 which is adapted for guiding a cutting blade to cut one of the sides of the cut-out. The body 104 of each frame member 102 may be provided with measuring indicia to indicate a portion of the length of the side formed by the guide edge 106 of the particular frame member. Each member 102 further comprises and means for engaging a portion of the body the adjacent frame member such that the guide edges of adjacent frame members form the sides and one corner of the polygon formed by the device.

The engaging means preferably comprises a curved support surface 110 and means for holding a portion of the body 104 of an adjacent frame member against the curved support surface 110. In the preferred embodiment, the curved support surface is at the end of the body 104 of each frame member 102. The holding means can comprises a bridge member 112 mounted on the top of the body 104, and extending outwardly from the same end as curved support surface. A slot 114 extends longitudinally in each bridge member, generally outwardly from the curved support surface. A gripper 116 is adjustably mounted in the slot 114, opposite the curved support surface 110 to hold a portion of the body of the adjacent frame member tangentially against the curved support surface 110. The gripper 116 has a generally V-shaped groove 118 adapted for engaging a beveled edge 120 on the adjacent frame member. The beveled edges 120 and the V-shaped grooves 118 cooperate to hold the adjacent frame members together while permitting relative adjustments between them. The gripper 116 can freely pivot and slide in slot 114, and means, such as threaded fastener 122, is provided for mounting and releasably locking the gripper 116 in the slot 114. The fastener 122 has a knurled head 124 and a threaded shank 126 that extends through the slot 114 and is threaded into the gripper 116. The fastener 122 has a shoulder 128 adapted to engage the marginal edges of the slot 114 so that when the fastener 122 is tightened, the gripper 116 is held in place by friction. The gripper 116 can thus be releasably secured in place to hold a portion of an adjacent frame member at a selected position and angular orientation with respect to the frame member. The frame members 102 thus can be arranged to correspond to the size and shape of the desired cut-out and releasably secured in this configuration by tightening fasteners 122.

OPERATION

The device 20 is manipulated to the size and shape of the desired cut-out by sliding the frame members 22. For example, to make a cut-out to fit a particular space on a layout, the device 20 may be positioned on the layout and the frame members 22 adjusted until the shape defined by the guide edges 26 of the frame members corresponds to the space on the layout. The measurement indicia on the frame members 22 aids in adjusting the device to the proper size and shape. The detent locking mechanism releasably locks the device 20 in this configuration so that it may be transferred to the sheet material from which the cut-out is to be made.

The device 20 is positioned over the sheet material until the desired portion of the sheet is framed by the guide edges 26 of the frame members. This allows the user to see exactly what the completed cut-out will look like. The user then simply holds the device 20 down and with a cutting blade, such as a utility knife, cuts along the guide edges 26. The slots 44 and 46 allow the knife to fit all the way into the corners of the device and beyond the guide edge of the adjacent frame member so that the corners of the cut-out are completely cut and are sharply formed.

The device 100 is used in a similar manner. The device 100 is assembled with the appropriate number of frame members 102 to form the desired polygonal shape. The device 100 is than manipulated to the desired size and shape, and releasably locked in this position by turning the knurled heads 124 on the fasteners 122 on each frame member to secure the grippers 116 in position to hold a portion of the adjacent frame member tangentially against curved support surface 110. The curved support surface 110 can engage the adjacent frame member virtually anywhere along its length, and at a wide range of angular orientations allowing the user to form a wide variety of polygonal shapes.

Once secured in the desired configuration, the device 100 can then be used like device 20 to frame and cut the cut-out.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An adjustable template device for positioning over a sheet material for use in framing and cutting the sheet material to a selected shape, the device comprising:

a plurality of slidably interconnected frame members forming a closed polygon, each frame member comprising a guide edge for guiding a cutting blade and means adjacent one end of the guide edge for slidably receiving a portion of an adjacent frame member such that the guide edges of adjacent frame members form the sides and one corner of the polygon formed by the device; and ratchet means for retarding relative sliding of adjacent frame members.

2. An adjustable template device for positioning over a sheet material for use in framing and cutting the sheet material to a selected shape, the device comprising:

a plurality of slidably interconnected frame members forming a closed polygon, each frame member comprising an elongate body having a guide edge for guiding a cutting blade, and a socket adjacent one end of the guide edge, adapted for slidably receiving the body of an adjacent frame member so that the guide edges of the adjacent frame members form the sides and one corner of the polygon formed by the device; and ratchet means associated with each socket for retarding relatively sliding of the body in its respective socket.

3. The adjustable template device according to claim 2 wherein the body of each frame member has a plurality of detents, and wherein the ratchet means comprises means associated with the socket for engaging these detents.

4. The adjustable template device according to claim 3 wherein each guide edge has a plurality of slots therein positioned relative to the detents so that when a detent on a first frame member is engaged by the engaging means on a second frame member, a slot on the first frame member is aligned with the guide edge of the second frame member so that a cutting blade guided along the guide edge of the second frame member can extend into the slot to fully cut the corner formed by the frame members.

5. An adjustable template device for positioning over a sheet material for use in framing and cutting the sheet material to a selected shape, the device comprising:

a plurality of slidably interconnected frame members forming a closed polygon, each frame member comprising an elongate body having a guide edge for guiding a cutting blade, and a socket adjacent one end of the guide edge, adapted for slidably receiving the body of an adjacent frame member so that the guide edges of the adjacent frame members form the sides and one corner of the polygon formed by the device;

the guide edge of the each frame member having a slot therein adjacent the socket and aligned with the guide edge of the adjacent frame member received in the socket, so that a cutting blade guided along the guide edge of the adjacent frame member can extend into the slot to fully cut the corner formed by the frame members.

6. The adjustable template device according to claim 5 further comprising ratchet means associated with each socket for retarding relative sliding of the body in its respective socket.

7. The adjustable template device according to claim 6 wherein the body of each frame member has a plurality of detents and wherein the ratchet means comprises means associated with the socket for engaging these detents.

8. The adjustable template device according to claim 7 wherein each guide edge has a plurality of slots therein positioned relative to the detents so that when a detent on a first frame member is engaged by the engaging means on a second frame member, a slot on the first frame member is aligned with the guide edge of the second frame member so that a cutting blade guided along the guide edge of the second frame member can extend into the slot to fully cut the corner formed by the frame members.

9. An adjustable template device for placement over a sheet material for use in framing and cutting the sheet material to a selected shape, the device comprising:

a plurality of interconnected, angularly adjustable frame members forming a closed polygon, each frame member comprising a guide edge for guiding a cutting blade and means adjacent one end of the guide edge for adjustably engaging a portion of an adjacent frame member such that the guide edges of the adjacent frame members form the sides and a corner of the polygon formed by the device, the adjustable engaging means comprising a curved support surface, a gripper member, and means for adjustably securing the gripper member opposite the curved support surface to hold a portion of the adjacent frame member tangentially against the curved support surface.

10. The adjustable template device according to claim 9 wherein the gripper is movable toward and away from the curved support surface and can be pivoted.

11. The adjustable template device according to claim 10 whereient eh gripper is pivotally and slidably mounted in a slot adjacent to and extending generally outwardly from the curved support surface, and further comprises means for releasably locking the gripper in the slot.

12. An adjustable template device for placement over a sheet material for use in framing and cutting the sheet material to a selected shape, the device comprising:

a plurality of adjustably interengaged frame members forming a closed polygon, each frame member comprising a guide edge for guiding a cutting blade and means adjacent one end of the guide edge for adjustably engaging a portion of an adjacent frame member such that the guide edges of adjacent frame members form the sides and a corner of the polygon formed by the device, the adjustable engaging means comprising a curved support surface and means for holding a portion of the adjacent frame member in tangential abutment with the curved support surface.

13. The adjustable template device according to claim 9 wherein the holding means comprises a slot in the frame member extending generally outwardly from the curved support surface, and a gripper member received in the slot for pivotal movement and movement toward and away from the support surface, and means for releasably securing the gripper member in the slot to hold a portion of the adjacent frame member at a selected position and angular orientation with respect to the frame member.

14. The adjustable template device according to claim 13 wherein the curved support surface comprises a semicircular surface facing generally axially outwardly adjacent one end of the frame member, and further comprising an axial slot in the frame member extending generally outwardly from the support surface, a gripper member slidably and pivotally mounted in the slot, and means for releasably securing the gripper member in the slot to hold the a portion of an adjacent frame member tangentially against the semicircular support surface in a selected position and orientation.

*15. An adjustable template device for positioning over a sheet material for use in framing and cutting the sheet material to a selected shape, the device comprising four slidably interconnected frame members forming a closed rectangle, each frame member comprising an elongate body having a guide edge for guiding a cutting blade, and a socket adjacent one end of the guide edge for slidably receiving a portion of an adjacent frame member such that the guide edges adjacent frame members form the sides and one corner of the rectangle formed by the device, the body of each frame member including measuring indicia starting at the end of the body adjacent to the socket to indicate the length of the side formed by the guide edge of the particular frame member.*

*16. The adjustable template device according to claim 15 wherein the socket of each frame member comprises a guide portion spaced from the end of the body and a bridge portion bridging the guide portion to the body, the guide portion engaging an edge of a corresponding adjacent frame member for slidably guiding such corresponding adjacent frame member, said corresponding adjacent frame member passing under the bridge portion so that a portion of the body of the corresponding adjacent frame member below the bridge portion is engageable with the sheet material.*

* * * * *